Patented Jan. 5, 1932

1,839,928

UNITED STATES PATENT OFFICE

SCOTT H. PERRY, OF BATAVIA, NEW YORK

PROCESS OF MAKING CEREAL FOOD PRODUCT

No Drawing.     Application filed June 25, 1928.   Serial No. 288,298.

My invention relates to a cereal food product and process of making same.

The principal object of my invention is to devise a food product, formed by a blending of several kinds of cereal grains, which shall embody the attributes of a complete cereal food through utilizing the constituents characteristic of each grain.

A further object is to devise a food product as above described, and particularly one composed of the grains of wheat, barley, and oats, which shall be thoroughly cooked before reaching the consumer, thus making available the full nutriment of these grains in their most digestible condition, and which, when prepared for the table with the usual liquids, is characterized by a degree of firmness sufficient to induce thorough mastication and a desirable stimulation of the salivary glands.

A further object is the contrivance of a process for the manufacture of the above product which shall preserve and suitably blend the food compounds of the grains employed, and also effect a transformation of the grains into a palatable state.

In the present manufacture of the so-called breakfast foods, the common practice is to employ, for any given food, grains of one kind, usually either wheat, oats, corn, barley or rice, to form a granulated, shredded, or flaked, product which may, or may not, require further cooking on the part of the consumer. The cereal grains, however, differ characteristically in their chemical composition, so that a food product made wholly from one grain may, for example, contain a satisfactory percentage of proteins, but be low in carbohydrates, or vice versa, or it may be lacking in certain valuable mineral salts. Which ever of the grains is selected and regardless of the character of the process to which it is subjected, the final product will necessarily be inferior in that it is lacking in certain essentials requisite to a complete food.

In addition to the above objection, it is well known that certain of the present cereal foods reach the consumer in either a partly cooked, or a wholly uncooked, condition, thus necessitating further cooking before the food is ready for actual use. Other foods exhibit a mushy characteristic when prepared for the table and hence are ineffective as a means of promoting a flow of saliva as an aid in digestion, while others are so poorly formed as to break down under mastication leaving certain portions which are highly resistant to the teeth, such as the bran in wheat products.

It is the purpose of my invention to produce a cereal food that shall be free from the foregoing objections in that it shall be a complete, nutritious product, thoroughly cooked, palatable and of a character to induce proper mastication. In forming my improved food, wheat, barley and oat grains are preferably employed in some predetermined proportion, the constituent elements of which are thoroughly blended together so that the resulting product is of a homogeneous character. While differing in food content, these grains bear certain definite relations to each other in respect of nutritious values, wheat for example, possessing a high albuminoid and carbohydrate content, barley a relatively low albuminoid but a high carbohydrate content, with oats occupying an intermediate position between wheat and barley in point of albuminoid content, but possessing a relatively high oil content.

Hence, a composition of the foregoing cereals will be rich, both in the body building and energy producing nitrogenous compounds, and also in the heat and energy producing starchy matter. The proportions of the grains may be adjusted as desired and, accordingly, I do not desire to be limited as to the exact proportions used, nor to a food composed of all three grains, for it is contemplated that, in any given case, a union of any two of the grains may produce a satisfactory food.

These and further objects of my invention will be set forth in the following specification, and the novel means by which said objects are effectuated will be definitely pointed out in the claims.

In carrying out my improved process, the wheat, oat and barley grains are first thoroughly cleaned in any approved manner, thus removing all foreign substances and preparing the grains for reduction. The grains are then given a preliminary softening of a degree sufficient to cause a flowing together of the component elements of the various grains under presure, as hereinafter described. It has been ascertained that this step in the process for the wheat and barley grains may be effected by a partial cooking thereof, either separately or with the two kinds of grains mixed together, while the oats are soaked separately, or they may be softened by a moist steaming. It will be understood, however, that I do not desire to be restricted in the method of softening the various grains, as methods other than those indicated may be utilized.

Curing or tempering of the wheat comprises the next step in the process. At this stage, the grains, although somewhat softened are still whole and they may be mixed together either before or after the tempering step. This phase of the process removes a sufficient percentage of the moisture content of the partially cooked grains for the purpose of preventing any excessive adherence thereof to the reduction rolls and it also possesses the practical advantage of softening and otherwise conditioning the grains for said rolls, for which a particular consistency is desired. The tempering also serves to render the grains more digestible.

The three kinds of whole grains having been mixed together, they are next passed through a reduction machine which is composed either of one smooth roll and one roll having a plurality of circumferential grooves cut in the surface thereof, or of one smooth roll and one circumferentially and longitudinally grooved roll, or of two such grooved rolls, provided with combs, or scrapers, for removing the product therefrom. I do not desire to be limited to the particular kind of rolls heretofore described, as the essence of this step in the process is the reduction of the whole grains, partly cooked and tempered, to a thoroughly mixed condition by a direct and single action. It is contemplated that these rolls shall be placed in contact, the grains therefor being forced and impacted into the grooves and removed therefrom by the scrapers. Reducing the grains according to this method not only effects a thorough mixing of the different kinds of grains, but also of the component parts of each grain and this result is achieved without any necessity for grinding. If desired, the mass as it is delivered from the reduction rolls may be passed again between a second pair of such rolls, as it has been ascertained that the consistency of the product is thereby improved.

At this stage, the substance is moist and pliable and is then cooked for several hours in any approved form of apparatus, preferably using only an amount of water that can be absorbed by the substance, thus transforming the elements of the various grains into a condition easily assimilable by the human system. This step is a complete cooking treatment, serving to distribute the colloidal property of the grains, embodied in the starch and gluten, throughout the mass and softening and expanding the cellulose content of the grains.

The substance is then permitted to cool finally achieving a partly gelatinous state or consistency, after which it may be cut into sheets or strips and dehydrated in a suitable oven. These sheets or strips are then ground to produce granules of any desired size. If desired, however, the gelatinous product may be dried in other forms, and it will also be understood that the product may be toasted either during or after the drying process in order to impart a special flavor.

A product made according to the foregoing process is characterized by several novel features. The thorough mixing, effected by the reduction rolls, of the component parts of each and of all of the grains distributes the starch and gluten throughout the mass so that the colloidal action of these elements in the presence of moisture renders the whole product gelatinous, and a uniform fusion of the elements of the original grains. It follows that the product will therefore have a single and slightly rubbery consistency when softened, thus offering a desirable, agreeable resistance to mastication, but the component elements of the product will not be separable into easily swallowed portions and relatively hard resistant portions, as would be the case in a product characterized by a mere agglutination of the various components. Briefly, it will be observed that the original grains are transformed into a gelatinous mass of uniform consistency and composition, and it is from this mass that the finished product is formed in the shape of granules, cakes, or other desired shapes.

The relative amounts of the various grains employed are preferably in the proportion of eight parts of wheat, four parts of oats, and two parts of barley, although this formula is to be regarded as merely suggestive. As prepared by the above process, the product is thoroughly cooked, but in preparing for the table, it is deemed advisable to boil the same in water for from one to three minutes in order to cause absorption thereof for effecting a hot food. This method of handling is entirely for the purpose of softening the product, but not to the extent of destroying its resistance to mastication.

It will be evident that my improved food product possesses superior qualifications as a nutritious agent, owing to its embodiment of the essentials necessary to a complete food. The valuable mineral salts, the regulatory properties of bran, and the two main classes of feeding stuffs, the proteins and carbohydrates, are combined, according to my invention, in a product having a uniform consistency and one having appetizing and palatable qualities.

It will be particularly noted that, in the foregoing processing of the grains, the woody parts thereof, embodied in the bran and cellulose, are so thoroughly softened and expanded as to function with the greatest efficiency in aiding the progress of the food through the alimentary tract of the consumer. During the cooking steps of the process, the starches undergo a complete dextrinization which improves the digestibility of the product, but at no time does the temperature rise sufficiently high to destroy the vitamin content of the component cereal grains.

While I have shown one arrangement of steps in a process by which my improved product can be formed, it will be understood that the same are intended for illustration only and that many changes may be made therein without departing from the spirit of my invention and the scope of the appended claims.

I claim:

1. The herein described process of preparing a food from wheat, barley, and oat grains, which consists in softening each of said grains, mixing said grains while whole, reducing the assembly of grains to a thoroughly mixed mass, cooking and dehydrating said mass, and shaping the residue into any desired form.

2. The herein described process of preparing a food from wheat, barley, and oat grains which consists in partly cooking the wheat and barley grains, softening the oat grains, mixing all of said grains while whole, reducing the assembly of grains to a thoroughly mixed mass, further and completely cooking said mass, and dehydrating the same.

3. The herein described process of preparing a food from wheat, barley, and oat grains, which consists in softening the wheat and barley grains together, separately softening the oat grains, mixing all of said grains together while whole, reducing the assembly of grains to a thoroughly mixed mass, cooking and dehydrating said mass.

4. The herein described process of preparing a food from wheat, barley, and oat grains which consists in partly cooking the wheat and barley grains together, separately softening the oat grains, mixing all of said grains together while whole, reducing the assembly of grains to a thoroughly mixed mass, further and completely cooking said mass, and dehydrating the same.

5. The herein described process of preparing a food from wheat, barley, and oat grains which consists in partly cooking the wheat and barley grains together, separately softening the oat grains, tempering and mixing all of said grains together while whole, reducing the assembly of grains so that the elements thereof will combine to form a thoroughly mixed mass, further and completely cooking said mass, and dehydrating the same.

6. The herein described process of preparing a food from wheat, barley, and oat grains which consists in partly cooking the wheat and barley grains, separately softening the oat grains, tempering and mixing all of said grains together while whole, reducing the assembly of grains so that the elements thereof will combine to form a thoroughly mixed mass, further and completely cooking said mass in an amount of water that can be absorbed thereby, and dehydrating the same.

In testimony whereof, I affix my signature.

SCOTT H. PERKY.